Aug. 6, 1940. H. W. HINDES 2,210,810
BEARING AND FRAME CONSTRUCTION FOR HAND-OPERATED BEATERS
Filed July 20, 1938
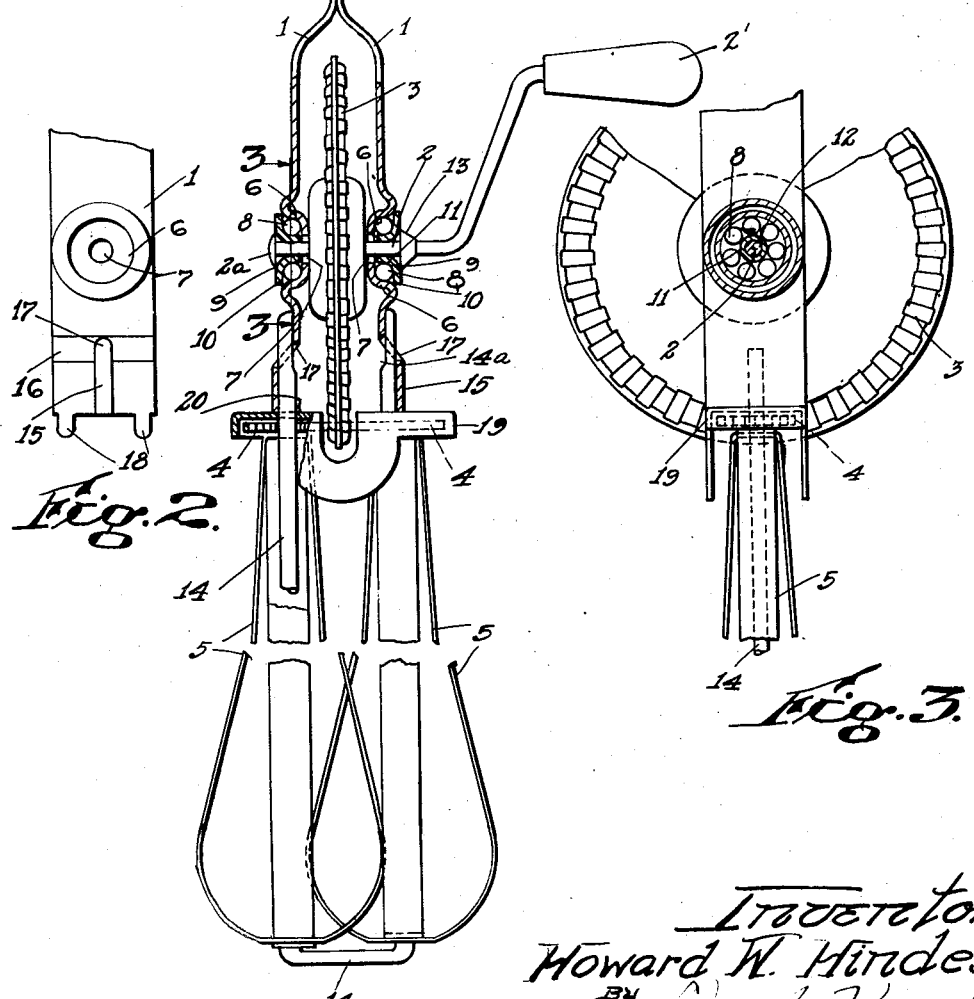
Inventor:
Howard W. Hindes Patented Aug. 6, 1940

2,210,810

UNITED STATES PATENT OFFICE 2,210,810

BEARING AND FRAME CONSTRUCTION FOR HAND-OPERATED BEATERS

Howard W. Hindes, Worcester, Mass., assignor to The Washburn Company, Worcester, Mass., a corporation of Massachusetts Application July 20, 1938, Serial No. 220,284

4 Claims. (Cl. 259—131)

The present invention relates to hand-operated beaters of the type intended for household use in beating eggs, dressings and the like.

One object of the invention is to provide an improved anti-friction bearing construction for supporting the hand-operated driving shaft of the beater, so as to reduce to a minimum the effort required to operate the beater. Accordingly, the shaft which carries a gear for driving the beating elements, is rotatably supported between a series of anti-friction members located between the shaft and the beater frame. A further object is to provide an improved mounting for the rod carrying the beater elements, and other advantageous features of the invention will more fully appear from the following description considered in connection with the accompanying drawing, in which:

Figure 1 is a view in side elevation of a beater embodying the present invention, with the parts involved in the bearing construction shown in section.

Fig. 2 is a fragmentary view of a portion of one of the frame members, with the bearing elements removed.

Fig. 3 is a sectional view along the line 3—3 of Fig. 1, looking in the direction of the arrows.

Referring first to Fig. 1, the frame of the beater comprises a pair of spaced side members 1, between which extends a shaft 2 carrying a gear 3 in mesh with pinions 4 connected to the beater elements 5. The particular arrangement between the driving gear 3, pinions 4 and beater elements 5, forms no part of the present invention, which has to do with an improved anti-friction bearing construction for supporting the shaft 2, so that it may be rotated by a suitable handle, with a minimum of effort.

In the improved bearing construction, each frame member 1 provides an annular seat 6 surrounding an opening 7 of greater diameter than the shaft 2, so that there is ample clearance for the shaft 2 in passing through the alined openings 7 of the pair of frame members 1. The seat is rounded to the curvature of a series of balls 8, and the balls 8 are retained in the sheet by means of a cup 9 providing an annular curved flange 10, fitting closely around the outer rim of the seat 6. The cup 9 also provides a central cylindrical portion 11, which supports the series of balls 8 in engagement with the opposed surfaces of the seat 6 and the flange 10.

The cylindrical portion 11 of each cup 9, provides an opening 12 of such diameter that the shaft 2 fits tightly within the opening, and the cup is adapted to rotate with the shaft. In assembling the parts, one cup 9 is mounted on the shaft 2, with its outer end surface abutting a shoulder 13 provided on the shaft. A series of balls 8 having been assembled within this cup, the shaft 2 is then inserted through the alined frame openings 7, with the end of the shaft 2 extending beyond the seat 6 provided in the left-hand frame member 1, and with the balls positioned within the seat 6 of the right-hand frame member. The second cup 9, with a second series of balls 8 assembled therein, is then forced on the end of the shaft 2, the shaft being of sufficient length so that the end thereof extending beyond the cup, may be riveted over at 2a, as indicated. This last operation serves to clamp the two series of balls 8 between the cups 9 and seats 6, on opposite sides of the gear 3.

When the shaft 2 is turned by its handle 2', the cups 9 turn with the shaft, so that the whole shaft assembly, including the driving gear 3, is supported by the two series of balls 8. Due to the fact that the shaft extends freely through the openings 7 in the frame members 1, there are no parts binding on the shaft 2 as it rotates, and the bearing pressure is evenly divided on opposite sides of the gear 3, between the two series of balls 8 running in the raceways provided by the frame seats 6 and the cups 9. It is evident from a consideration of Fig. 2, that when the parts have been assembled, as described above, the two series of balls 8 are substantially enclosed by the cup flanges 10, so that the possibility of foreign matter getting into the ball bearings, is substantially eliminated.

From the foregoing, it is apparent that by the present invention there is provided an improved anti-friction bearing construction for the driving shaft of a hand-operated beater, characterized by the fact that the shaft is entirely supported by the two series of balls, so that the effort required to drive the beater is reduced to a minimum.

As previously pointed out, the invention also contemplates an improved mounting for the U-shaped rod 14, on which the beater elements 5 are rotatably mounted, as shown in Fig. 1. The spaced legs of this rod 14 extend upwardly above the pinions 4, and are received in semi-cylindrical depressions 15 formed at the lower end of each frame member 1. As best shown in Fig. 2, an offset 16 provided in each frame member 1, above the depression 15, has an opening 17, through which an end of the rod 14 may pass. The lower end of each frame member 1 also provides spaced ears 18, which are adapted to be received in openings provided by a yoke 19, with bending over of the ears 18 serving to secure the frame members 1 and yoke 19 together.

In putting the parts of the beater together, the elements 5 and pinions 4 are first assembled on the U-shaped rod 14, after which the free ends of the rod are passed through the openings 17 in the offset portions 16 of each frame member 1. In order that the ends of the rod 14 may pass freely through the openings 17, the ends are slabbed off, as indicated at 14a, and it is to be noted that these slabbed-off ends closely engage the outside of each annular ball seat 6, when the assembly has been completed. In other words, the ball seats 6, provided by the frame members 1, act as abutments to positively limit movement of the rod ends through the openings 17, when the parts are assembled, thereby assuring a uniform relation between the parts, when producing the beaters in large quantities.

After the rod ends have engaged the frame seats 6, as shown in Fig. 1, the rod 14 is locked in position by prick-bunching each leg thereof at 20, flush with the upper surface of the yoke 19. In the completed beater, the rod 14 is therefore very rigidly supported by the frame member 1, by reason of the abutting engagement of its free ends with the bearing seats 6, with the semi-cylindrical depressions 15 serving to maintain the legs of the rod in alinement, so that the beater elements 5 will always rotate freely thereon, when driven by the gear 3 and cooperating pinions 4.

I claim:

1. A beater comprising a frame providing spaced legs having alined openings, a shaft extending freely through and beyond said frame openings and carrying a driving gear between said legs, a series of balls surrounding said shaft beyond each frame opening, oppositely facing pairs of race-ways for said balls provided by said frame and by members rotatable with said shaft, and means for holding said race-way members comprising enlargements formed on said shaft to maintain both series of balls in rolling contact with said pairs of race-ways.

2. A beater comprising a frame providing spaced legs having alined openings, oppositely facing annular seats surrounding said openings, a shaft extending freely through and beyond said openings and carrying a driving gear between said legs, members mounted on said shaft outside of said frame legs and providing annular seats opposing the seats on said legs, and a series of balls positioned between each pair of seats.

3. A beater comprising a frame providing spaced legs having alined openings, oppositely facing annular seats surrounding said openings, a shaft extending freely through and beyond said openings and carrying a driving gear between said legs, members mounted on said shaft outside of said frame legs and providing annular seats opposing the seats on said legs, a series of balls positioned between each pair of seats, and enlargements formed on said shaft to maintain both series of balls in rolling contact with said pairs of seats.

4. A beater comprising a frame providing spaced parallel legs having alined openings, outwardly concave annular seats surrounding said openings, a shaft extending freely through said openings and beyond said seats carrying a driving gear disposed between said legs, members mounted on said shaft outside of said legs and providing inwardly concave annular seats opposing the seats on said legs, a series of balls positioned between each pair of opposed seats, and enlargements formed on said shaft and engaging the outside of said members, to maintain both series of balls in rolling contact with said pairs of seats.

HOWARD W. HINDES.